M. P. Larry
Upsetting Tires.
Nº 38,398.   Patented May 5, 1863.

Witnesses:
J. W. Coombs
G. W. Reed

Inventor:
M. P. Larry
per Munn & Co.
Attorneys

UNITED STATES PATENT OFFICE.

M. P. LARRY, OF WINDHAM, MAINE.

IMPROVEMENT IN APPARATUS FOR UPSETTING TIRES.

Specification forming part of Letters Patent No. 38,398, dated May 5, 1863; antedated January 16, 1863.

*To all whom it may concern:*

Be it known that I, M. P. LARRY, of Windham, in the county of Cumberland and State of Maine, have invented a new and Improved Device for Upsetting Tires; and I do hereby declare that the following is a full, clear, and exact description of the same, reference being had to the accompanying drawings, making a part of this specification, in which—

Figure 1:
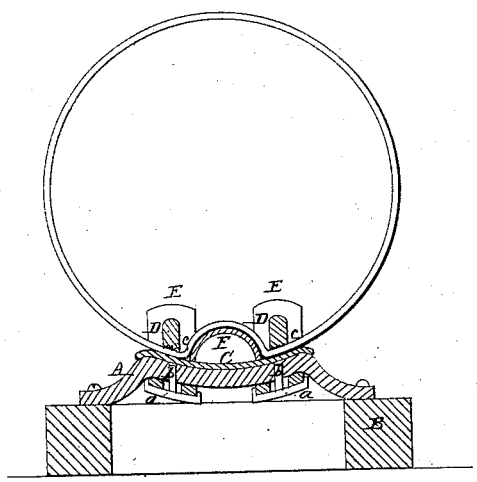
Figure 2:
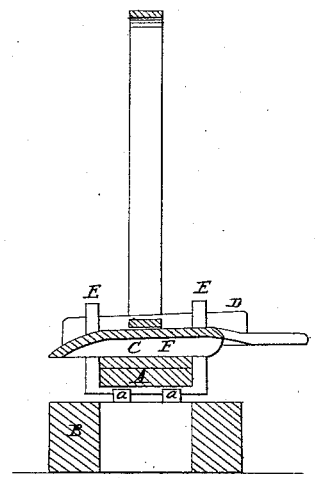
Figure 3:
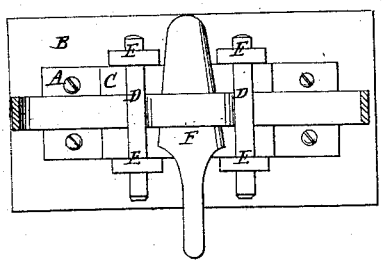

Figure 1 represents a longitudinal vertical section of my invention. Fig. 2 is a transverse vertical section of the same. Fig. 3 is a plan or top view of the same.

Similar letters in the three views refer to corresponding parts.

This invention consists in giving to the keys which hold the tire down upon the anvil beveled edges, so that a slight motion of the tire in a direction transversely to said keys has a tendency to turn them edgewise and to bring their edges down upon the tire with increased tightness, and that by these means a slipping of the tire under the keys during the operation of upsetting is entirely prevented.

To enable those skilled in the art to make and use my invention, I will proceed to describe it.

The anvil A is curved on its surface to suit tires of the most common size, and it is firmly secured to a block, B, of wood or any other suitable material.

In order to adapt the surface of the anvil to tires of different diameters, I use one or more false anvils, C, which may be placed loosely on the main anvil A, or which may be fastened to the same by means of studs or screws, so that they can be easily removed.

By using false anvils of different shape the surface of the anvil can be adapted to tires of different diameters. The tire is held down upon the anvil by means of keys D, which are made of steel, and which pass through stap'es E. Said staples are attached to the anvil A near its ends, being bent under said anvil and held in place by clamps $a$ and rivets $b$. By taking out these clamps the staples can be removed. The edges $c$ of the keys which bear down upon the tire are beveled off, as clearly shown in Fig. 1 of the drawings, and their backs are rounded or convex, fitting to the concave form of the staples, and they pass freely through the staples, so that they are free to assume a slight lateral motion. If the crook on the tire is now commenced to be hammered down and the iron assumes a motion in a direction transversely to the keys, said keys turn slightly in the staples, causing their edges to bear down upon the tire with increased force, so as to effectually prevent a further motion of the iron. By this improvement the operation of upsetting tire is considerably facilitated.

F is the convex wedge or guide, which is placed under the crook and gradually withdrawn as the iron is hammered down into its original shape. Without this wedge or guide, and particularly when the amount to be taken up is quite large, if the iron is not evenly heated, the inexperienced operator in hammering it back is liable to make a false crook.

By using the wedge, on the other hand, it is quite easy to bring the iron down to a uniform thickness.

Having thus fully described my invention, what I claim as new, and desire to secure by Letters Patent, is—

A tire-shrinker constructed, combined, and arranged as shown and described.

MESHACH P. LARRY.

Witnesses:
 JOHN WEBB,
 L. T. CHASE.